US009689466B2

(12) United States Patent
Kanai et al.

(10) Patent No.: US 9,689,466 B2
(45) Date of Patent: Jun. 27, 2017

(54) GEAR MOTOR INCLUDING REDUCTION MECHANISM

(71) Applicant: Nidec Copal Electronics Corporation, Tokyo (JP)

(72) Inventors: Takashi Kanai, Saitama (JP); Yusuke Tanaka, Saitama (JP); Hiroki Matsushita, Saitama (JP); Takayuki Endo, Saitama (JP)

(73) Assignee: NIDEC COPAL ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/042,597

(22) Filed: Feb. 12, 2016

(65) Prior Publication Data
US 2016/0238108 A1    Aug. 18, 2016

Related U.S. Application Data

(63) Continuation of application No. PCT/JP2014/004102, filed on Aug. 6, 2014.

(30) Foreign Application Priority Data

Aug. 23, 2013  (JP) .................................. 2013-173255

(51) Int. Cl.
*F16H 57/08*    (2006.01)
*F16H 1/36*    (2006.01)
(Continued)

(52) U.S. Cl.
CPC ................. *F16H 1/36* (2013.01); *F16H 1/28* (2013.01); *H02K 7/116* (2013.01)

(58) Field of Classification Search
CPC ... F16H 1/227; F16H 1/28; F16H 1/46; F16H 1/36; F16H 2001/2881; F16H 35/008; F16H 57/021; F16H 57/082; F16H 57/08; F16H 3/66; F16H 1/2863; F16H 2057/085; F16H 2001/2872; F16H 2200/2012; F16H 2200/2046; F16H 25/2252; F16H 3/62; F16H 57/02004; F16H 2055/176; F16H 2057/0056; F16H 2200/0069;
(Continued)

(56) References Cited

U.S. PATENT DOCUMENTS

| 5,295,925 | A  | * | 3/1994  | Hirabayashi | ......... | F16H 1/2836 475/331 |
| 6,220,984 | B1 | * | 4/2001  | Schulz      | ................ | F16H 1/2863 475/340 |
| 7,303,497 | B1 | * | 12/2007 | Wige        | .................... | F16H 35/008 475/1 |

* cited by examiner

*Primary Examiner* — Ramya Burgess
*Assistant Examiner* — Lillian Nguyen
(74) *Attorney, Agent, or Firm* — Norris McLaughlin & Marcus, P.A.

(57) ABSTRACT

The present invention provides a reduction mechanism in which high torque output can he achieved, thinness and size and weight reduction can be achieved, and the number of teeth of a gear and reduction ratio can be freely set. In a gear motor that includes a reduction mechanism in which a planetary two-stage gear is arrayed between a sun gear of a planetary gear mechanism and an internal gear of a planetary gear mechanism, the reduction mechanism has at least a single planetary two-stage gear arrayed such as to be positioned between the sun gear and the internal gear and including a small gear or a large gear that meshes together with a large gear or a small gear of the planetary two-stage gear, and both end portions of the at least a single planetary two-stage gear are supported by ball bearings.

8 Claims, 14 Drawing Sheets

(51) Int. Cl.
*H02K 7/116* (2006.01)
*F16H 1/28* (2006.01)

(58) Field of Classification Search
CPC ....... F16H 2200/201; F16H 2200/2043; F16H 37/0813; F16H 3/44; F16H 3/666; F16H 48/38; F16H 57/023; F16H 15/50; F16H 1/2809; F16H 1/02; F16H 2048/106; F16H 2048/364; F16H 2048/423; F16H 2048/426; F16H 2057/087; F16H 2200/0065; F16H 3/48; F16H 3/58; F16H 48/10; F16H 48/11; F16H 55/17; F16H 57/0006; F16H 57/025; F16H 57/043; F16H 57/0479; F16H 57/0482; F16H 57/0486; F16H 57/10; F16H 13/08; F16H 15/503; F16H 15/52; F16H 19/001; F16H 1/00; F16H 1/003; F16H 1/22; F16H 1/2827; F16H 1/2836; F16H 1/2845; F16H 1/30; F16H 1/321; F16H 1/34; F16H 1/48; F16H 2003/442; F16H 2003/445; F16H 2003/447; F16H 2025/2087; F16H 2045/0268; F16H 2048/382; F16H 2048/385; F16H 2057/0062; F16H 2057/0087; F16H 2057/02069; F16H 2057/02082; F16H 2057/0335; F16H 2200/0021; F16H 2200/0034; F16H 2200/0047; F16H 2200/0052; F16H 2200/0073; F16H 2200/0078; F16H 2200/2005; F16H 2200/2007; F16H 2200/2023; F16H 2200/2028; F16H 2200/2035; F16H 2200/2041; F16H 2200/2048; F16H 2200/2097; F16H 2306/20; F16H 25/20; F16H 25/24; F16H 29/04; F16H 37/02; F16H 37/022; F16H 37/04; F16H 37/041; F16H 37/042; F16H 3/091; F16H 3/46; F16H 3/54; F16H 3/72; F16H 3/721; F16H 3/74; F16H 45/02; F16H 55/00; F16H 55/32; F16H 57/02; F16H 57/027; F16H 57/028; F16H 57/033; F16H 57/0402; F16H 57/0409; F16H 57/0412; F16H 57/0416; F16H 57/042; F16H 57/0421; F16H 57/0424; F16H 57/0458; F16H 57/046; F16H 57/0471; F16H 57/0476; F16H 57/0484; F16H 61/2807; F16H 61/30; F16H 61/68

See application file for complete search history.

GEAR MOTOR INCLUDING REDUCTION MECHANISM

BACKGROUND OF THE INVENTION

1. Field of the Invention

The present invention relates to a reduction mechanism for a gear motor or the like having high torque output and used in a muscle force assisting device or the like.

2. Description of the Related Art

Conventionally, a gear motor that has high torque output uses a multistage planetary gear system in which planetary gear mechanisms are stacked together in two stages and a reduction ratio is obtained.

However, in a system such as this, although high torque output can be achieved, there is a disadvantage in that size and weight reduction cannot be achieved.

Therefore, a compound planetary gear mechanism formed by the elements of two planetary gear mechanisms being joined in a planar manner is considered.

However, various conditions (such as geometric conditions, adjacency conditions, and assembly conditions) apply to the design of a planetary gear mechanism, thereby significantly limiting the degree of freedom in design thereof.

In particular, extremely strict restrictions are set by the assembly conditions for enabling all planetary gears to correctly mesh with a sun gear and an internal gear. There is a disadvantage in that the combinations of the numbers of teeth and the reduction ratio that can be selected are significantly limited.

[Patent Literature 1] Utility Model Publication No. S64-35237

[Patent Literature 2] Japanese Patent Publication No. 3248690

SUMMARY OF THE INVENTION

The present invention has been achieved in light of such disadvantages of the past. An object of the present invention is to provide a reduction mechanism that not only achieves high torque output, is thin, and is capable of being reduced in size and weight, but is also capable of enabling the number of teeth of a gear and reduction ratio to be freely set.

The object described above, other objects, and novel features of the present invention will become more completely clear when the following description is read with reference to the accompanying drawings.

However, the drawings are mainly for description and do not limit the technical scope of the present invention.

To achieve the above-described object, in the present invention, a gear motor including a reduction mechanism in which a planetary two-stage gear is arrayed between a sun gear of a planetary gear mechanism and an internal gear of a planetary gear mechanism is configured to include a reduction mechanism having at least a single planetary two-stage gear arrayed such as to be positioned between the sun gear and the internal gear and including a small gear or a large gear that meshes together with a large gear or a small gear of the planetary two-stage gear, and in which both end portions of the at least a single planetary two-stage gear are supported by ball bearings.

EFFECTS OF THE INVENTION

As is clear from the description above, the present invention achieves the following effects:

(1) According to a first aspect, the at least a single planetary two-stage gear including a small gear or a large gear that meshes together with a large gear or a small gear of the planetary two-stage gear is arrayed between the sun gear and the internal gear. Therefore, shaft instability and the like when unbalanced load occurs can be prevented with certainty. In addition, significant speed reduction and high torque output can be achieved. Thinness and size and weight reduction of the speed reduction section can be achieved.

(2) According to a second aspect, in addition to effects similar to above-described (1) being achieved, because the gear ratio of the large gear and the small gear of the planetary two-stage gear is not an integral multiple, reduction ratio (gear ratio) of the overall reduction mechanism can be specifically set. Therefore, freedom in design can be significantly improved.

In other words, an opportunity for selecting a desired gear ratio in relation to a determined outer diameter (size) can be obtained.

(3) According to a third aspect, in addition to effects similar to above-described (1) and (2) being achieved, because the planetary two-stage gear is arrayed in a horizontal direction such that the positional relationship of the small gear or the large gear of the planetary two-stage gear is reversed upside down, the reduction ratio can be increased without increase in thickness.

(4) According to a fourth aspect, in addition to effects similar to above-described (1) to (3) being achieved, because the modules (tooth size) of the large gear and the small gear of the planetary two-stage gear are set to differing values, and the module value of a gear (any of the sun gear, the internal gear, the planetary two-stage gear, and a planetary gear) that meshes with the large gear or the small gear of the planetary two-stage gear movement is set to match, further size reduction can be achieved while maintaining rotation smoothness.

Figure 1:
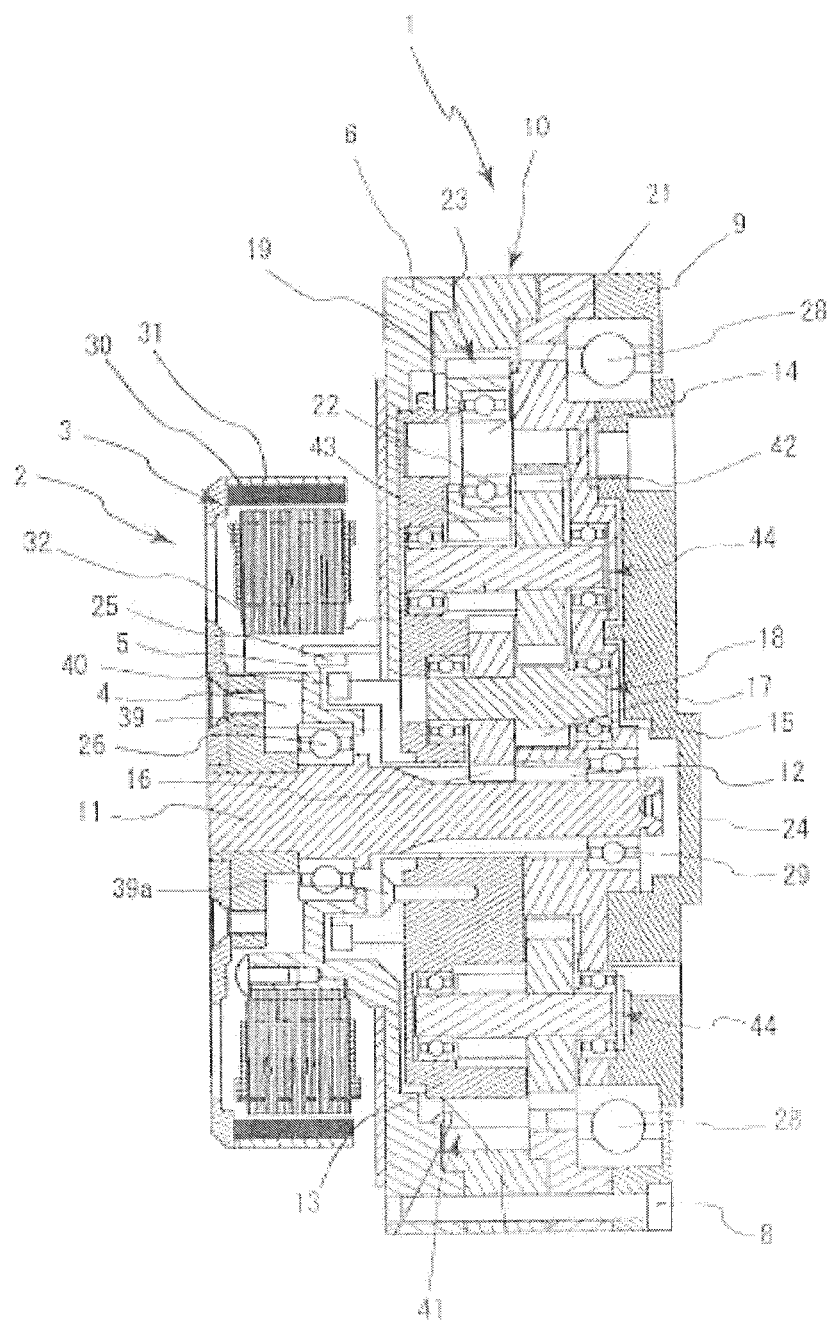
FIG. 1 is a cross-sectional view taken along line 1-1 in FIG. 2.
Figure 2:
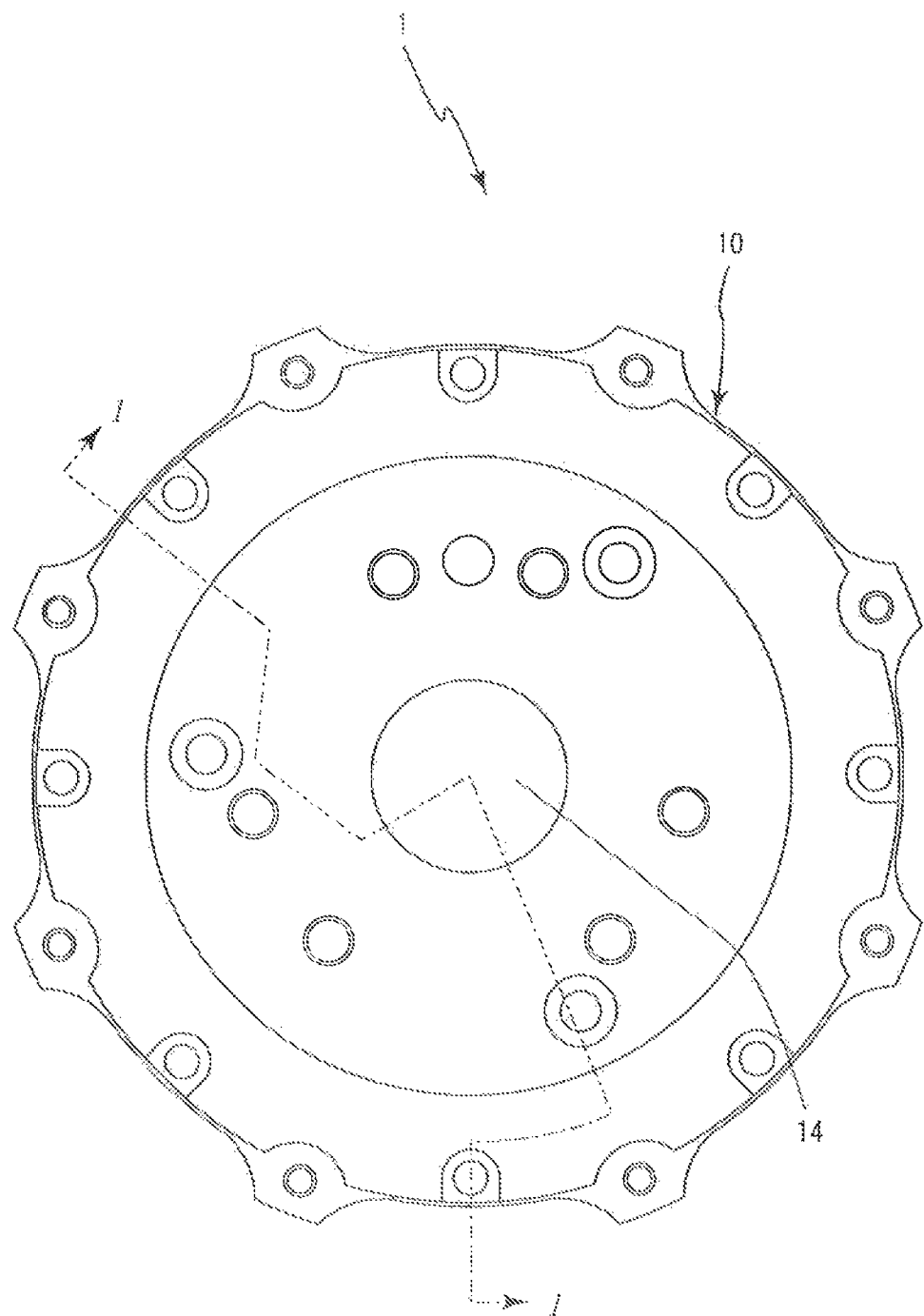
FIG. 2 is a planar view according to the first embodiment for carrying out the present invention.
Figure 3:
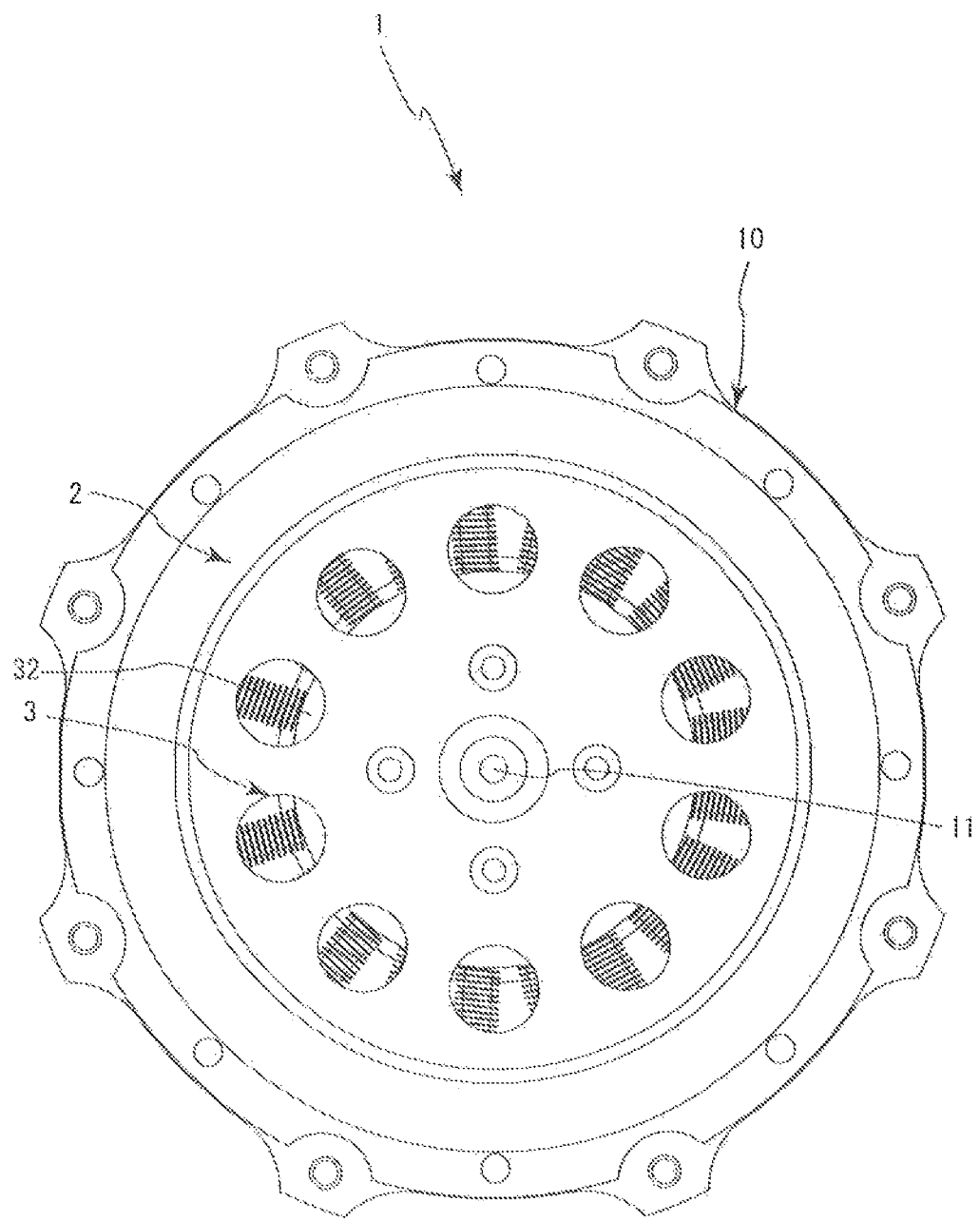
FIG. 3 is a bottom view according to the first embodiment for carrying out the present invention.
Figure 4:
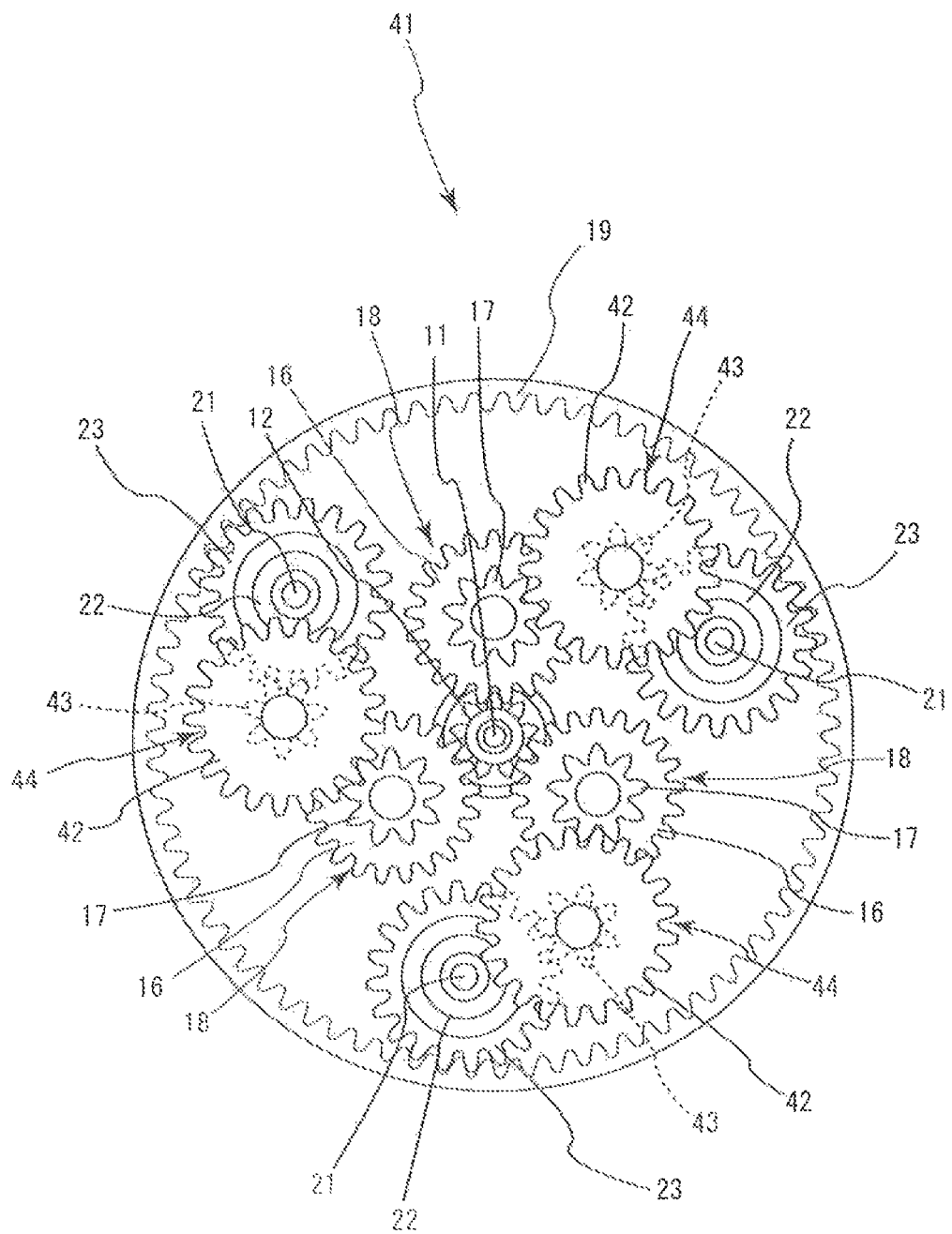
FIG. 4 is an explanatory diagram of a reduction mechanism according to the first embodiment for carrying out the present invention.
Figure 5:
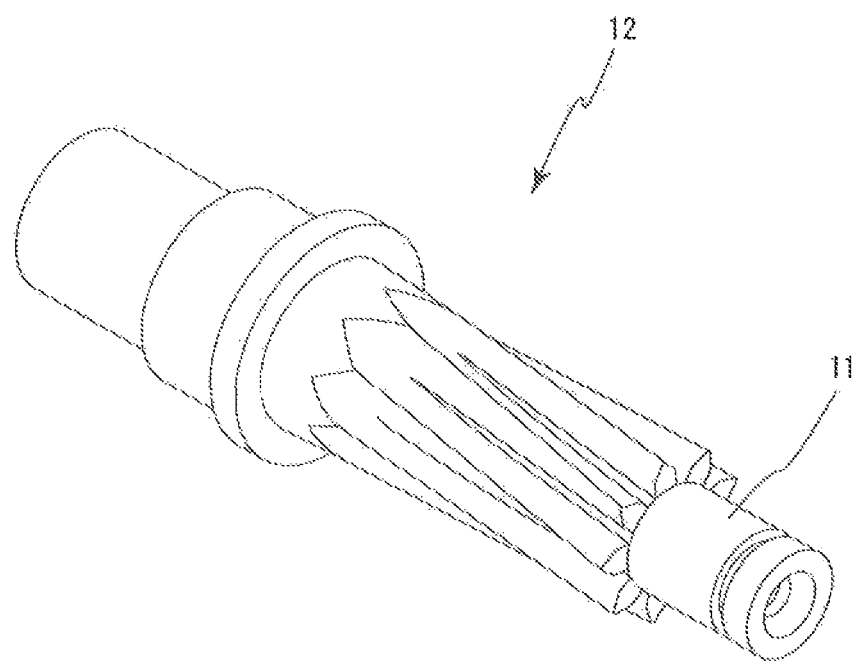
FIG. 5 is an explanatory diagram of a sun gear according to the first embodiment for carrying out the present invention.
Figure 6:
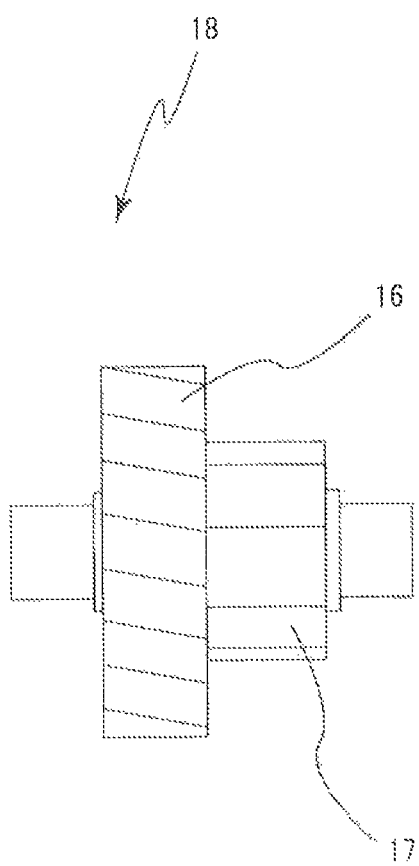
FIG. 6 is an explanatory diagram of a first planetary two-stage gear according to the first embodiment for carrying out the present invention.
Figure 7:
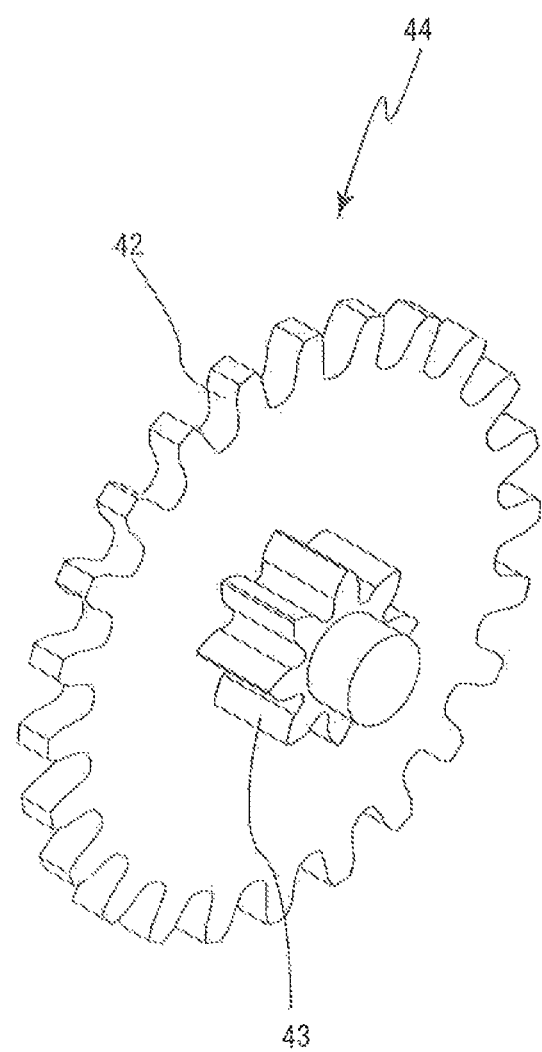
FIG. 7 is an explanatory diagram of a second two-stage gear according to the first embodiment for carrying out the present invention.
Figure 8:
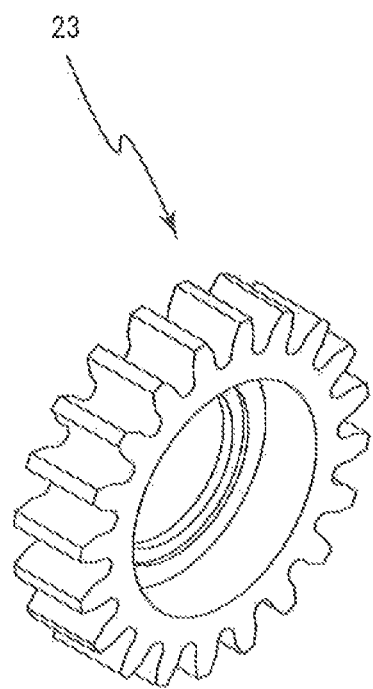
FIG. 8 is an explanatory diagram of a first planetary gear according to the first embodiment for carrying out the present invention.
Figure 9:
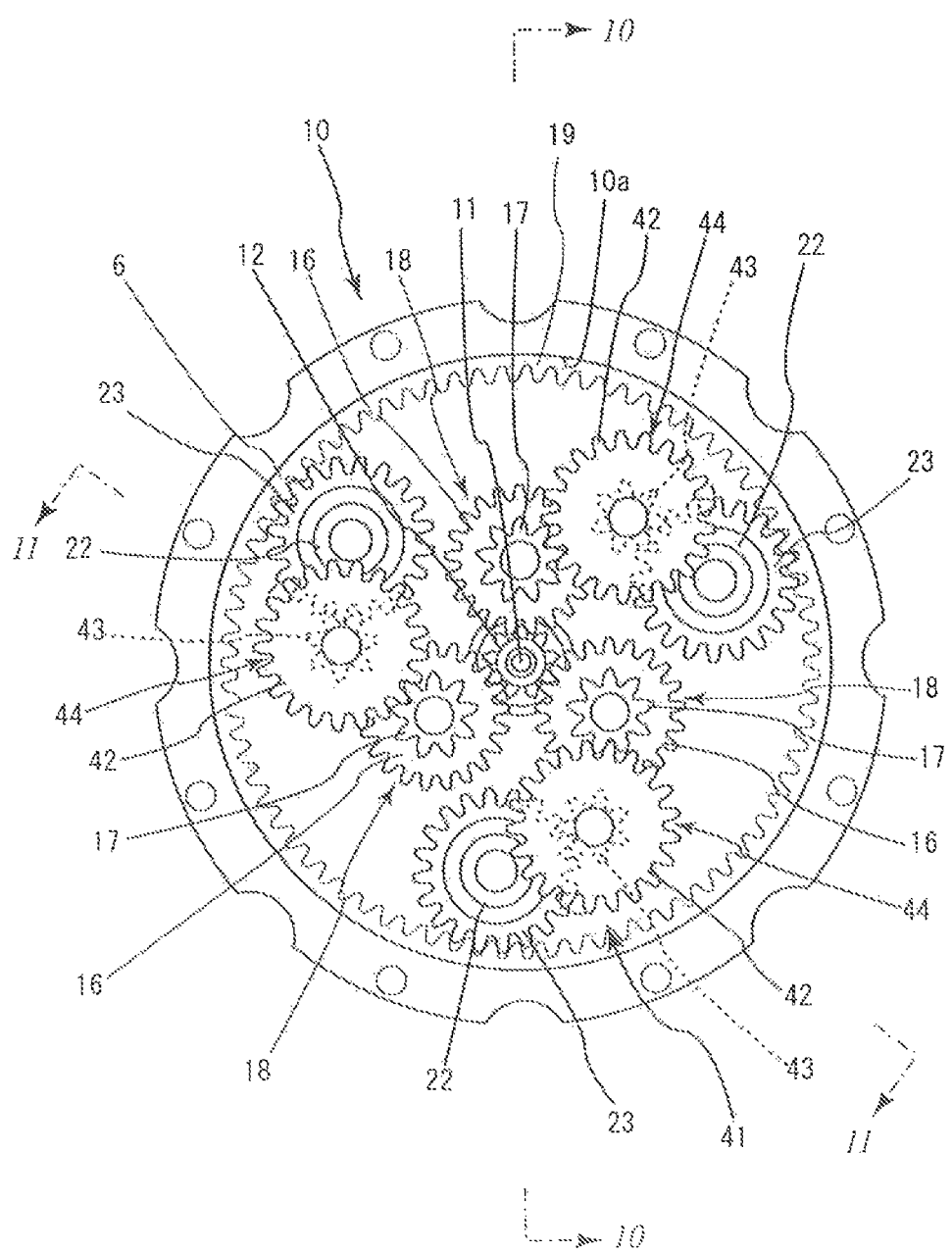
FIG. 9 is a planar view of an attachment state of the reduction mechanism according to the first embodiment for carrying out the present invention.
Figure 10:
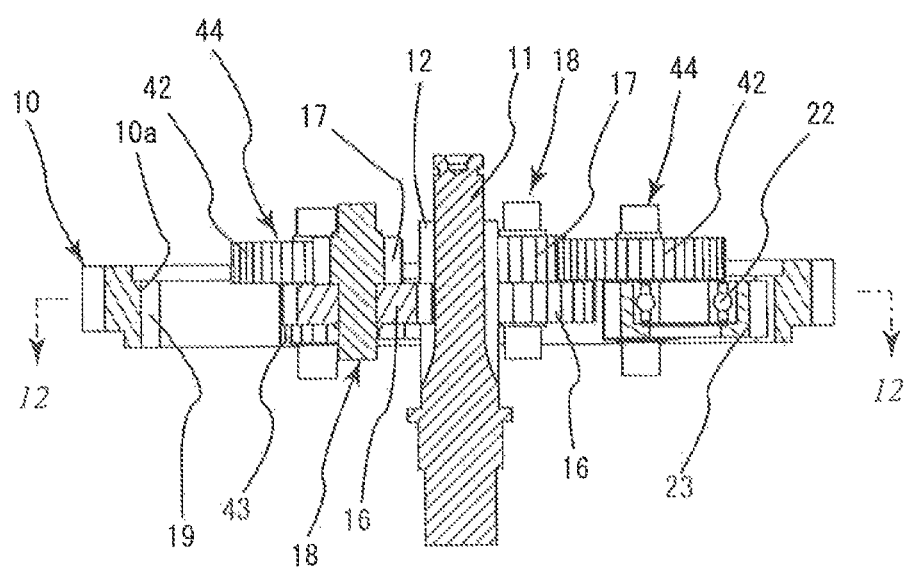
FIG. 10 is a cross-sectional view taken along line 10-10 in FIG. 9.
Figure 11:
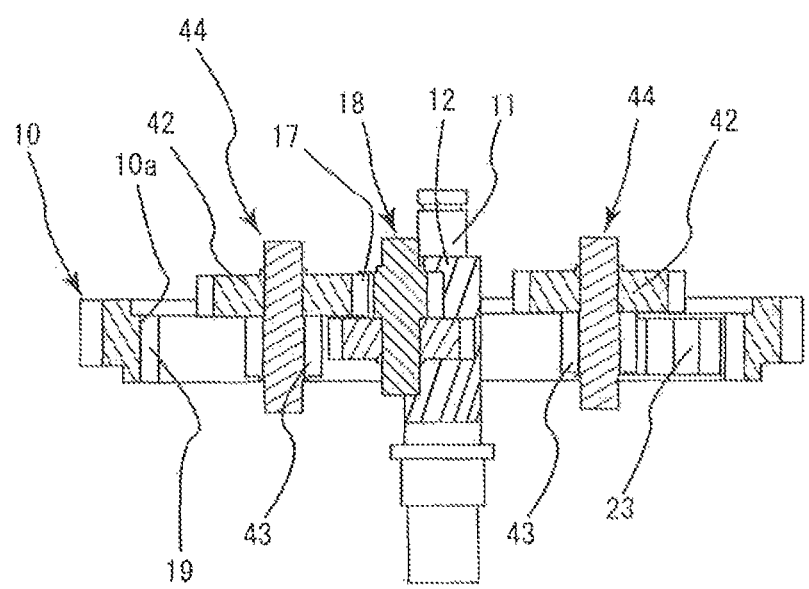
FIG. 11 is a cross-sectional view taken along line 11-11 in FIG. 9.
Figure 12:
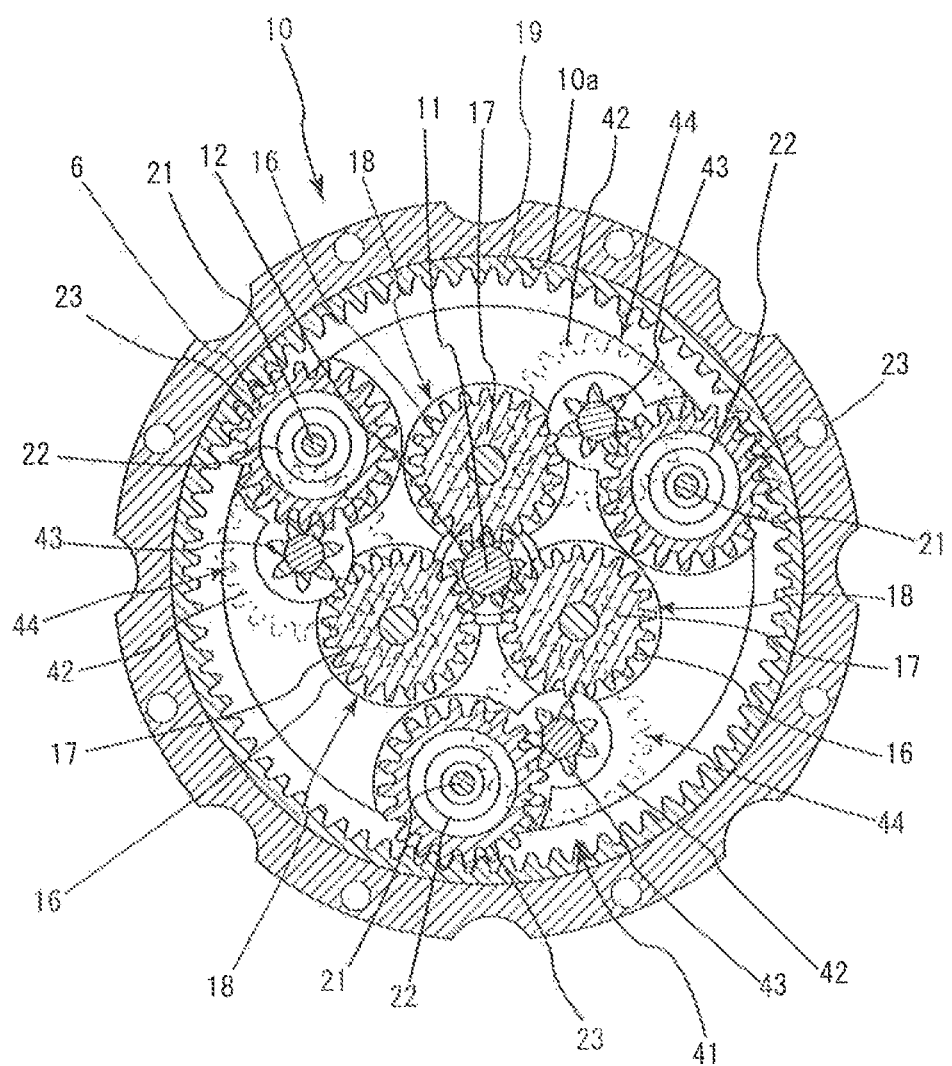
FIG. 12 is a cross-sectional view taken along line 12-12 in FIG. 10.

EXPLANATION OF REFERENCE NUMBERS 1, 1A, 1B: gear motor
2: outer-rotor motor
3: rotor
4: space
5: encoder housing chamber
6: motor base
8: screw
9: bearing housing case
10 planetary gear housing case
11: shaft
12: sun gear
13: sensor base
14: carrier mount
15: ball bearing
16: large gear
17: small gear
18: first planetary two-stage gear
19: internal gear
21: planetary gear shaft
22: ball bearing
23: planetary gear
24: shaft
25: absolute sensor
26: ball bearing
27: ball bearing
28: ball bearing
29: ball bearing
30: main magnet
31: outer cylinder
32: core
39: magnet attachment ring
40: ring-shaped magnet
41, 41A, 41B: reduction mechanism
42: large gear
43: small gear
44: second planetary two-stage gear
45: large gear
46: small gear
47: third planetary two-stage gear

DETAILED DESCRIPTION OF THE PREFERRED EMBODIMENTS

The present invention will be described in detail based on embodiments for carrying out the present invention shown in the drawings.

According to a first embodiment for carrying out the present invention shown in FIG. 1 to FIG. 12, reference number 1 represents a gear motor of the present invention that is thin, and is reduced in size and weight. The gear motor 1 is configured by: an outer-rotor motor 2; a planetary gear housing case 10 that is composed of a motor base 6 in which an encoder housing chamber 5 is formed that enters a free space 4 that is present in a center portion of a rotor 3 of the outer-rotor motor 2, and a shallow dish-shaped bearing housing case 9 that is fixed by a plurality of screws 8 to the motor base 6 with a carrier mount 14 therebetween, the carrier mount 14 configuring a portion of a planetary carrier that serves as an output shaft; a shaft 11 that is used for the outer-rotor motor 2 and is positioned within the planetary gear housing case 10; a reduction mechanism 41 that uses a planetary gear mechanism provided within the planetary gear housing case 10; a shaft 24 that is integrally formed as required with the carrier mount 14, has the same axial center as the axial center of the shaft 11, and is used as a cylindrical output shaft that projects further outward than the planetary gear housing case 10; a magnet attachment ring 39 that is attached by three screws 39a, 39a, and 39a to a sensor base 13 that configures the planetary carrier together with the carrier mount 14, in a section corresponding to the encoder housing chamber 5 of the planetary gear housing case 10; a ring-shaped magnet 40 that is attached to the magnet attachment ring 39 and serves as a rotation position information recording member that is magnetized on a side surface to provide an absolute sensor with position information; a magnetic absolute sensor 25 that is provided on a wall surface within the encoder housing chamber 5 of the planetary gear housing case 10 in a section corresponding to the ring-shaped magnet 40, and is capable of detecting the rotation angle of the sensor base 13 that rotates integrally with an output shaft after speed reduction; a ball bearing 26 that is interposed between a section near the lower end portion of the shaft 11 and the lower end portion of the motor base 6 of the planetary gear housing case 10; a ball bearing 28 that is interposed between an outer peripheral portion of a base portion of the shaft 24 and the bearing housing case 9 of the planetary gear housing case 10; and at ball bearing 29 that is interposed between an inner wall surface of the carrier mount 14 and an upper end portion of the shaft 11.

The reduction mechanism 41 is composed of: a sun gear 12 that has, for example, 9 teeth, is composed of a helical gear, and is fixed to a section of the shaft 11 that is positioned within the planetary gear housing case 10; the sensor base 13 and the carrier mount 14 that serves as an output shaft that are provided so as to integrally rotate within the planetary gear housing case 10; first planetary two-stage gears 18, 18, and 18 that are composed of large gears 16, 16, and 16 that each have, for example, 21 teeth, are composed of a plurality of helical gears, three according to the embodiment of the present invention, and of which both end portions of each large gear 16 are supported by the sensor base 13 and the carrier mount 14 with ball bearings 15 and 15 therebetween so as to mesh with the sun gear 12 that is fixed to the shaft 11 of the outer-rotor motor 2 in a section positioned within the planetary gear housing case 10, and small gears 17, 17, and 17 that each have, for example, 9 teeth and are respectively provided so that the axial centers are the same as the axial centers of the large gears 16, 16, and 16; second planetary two-stage gears 44, 44, and 44 that are composed of a plurality of large gears 42, 42, and 42 that each have, for example, 21 teeth, are arrayed in a direction parallel to the first planetary two-stage gears 18, 18, and 18, mesh with the small gears 17, 17, and 17 of the first planetary two-stage gears 18, 18, and 18, and of which both end portions of each large gear 42 are supported by the sensor base 13 and the carrier mount 14 that serves as an output shaft with the ball bearings 15 and 15 therebetween, and small gears 43, 43, and 43 that each have, for example, 7 teeth and are respectively provided so that the axial centers are the same as the axial centers of the large gears 42, 42, and 42; and planetary gears 23, 23, and 23 that each have, for example, 20 teeth, mesh with the small gears 43, 43, and 43 of the second planetary two-stage gears 44, 44, and 44, also mesh with an internal gear 19 that is fixed to an inner wall surface 10a of the planetary gear housing case 10, and are rotatably attached by ball bearings 22, 22, and 22 to planetary gear shafts 21, 21, and 21 that are attached to the sensor base 13 and the carrier mount 14 using bolts 20 and 20.

In the first planetary two-stage gears 18, 18, and 18, gears may be used such that the respective numbers of teeth of the large gears 16, 16, and 16 and the small gears 17, 17, and 17 are integral multiples. Alternatively, gears may be used such that the respective numbers of teeth of the large gears 16, 16, and 16 and the small gears 17, 17, and 17 are not integral multiples.

For example, in the case in which the sun gear 12 that has 9 teeth and the internal gear 19 that has 75 teeth are used, when the respective numbers of teeth of the large gears 16, 16, and 16 and small gears 17, 17, and 17 of the first planetary two-stage gears 18, 18, and 18 are integral multiples, when the large gear 16 of the first planetary two-stage gear 18 has 14 teeth and the small gear 17 has 7 teeth, and the large gear 42 of the second planetary two-stage gear 44 has 14 teeth and the small gear 43 has 7 teeth, the overall gear ratio (reduction ratio) is 34.3.

When the large gear 16 of the first planetary two-stage gear 18 has 14 teeth and the small gear 17 has 7 teeth, and the large gear 42 of the second planetary two-stage gear 44 is changed to have 21 teeth and the small gear 43 has 7 teeth, the overall gear ratio (reduction ratio) is 51.0.

In this way, even when the number of teeth of a gear is changed by the smallest unit, the overall gear ratio (reduction ratio) significantly changes.

Conversely, in the case in which the respective numbers of teeth of the large gears 16, 16, and 16 and the small gears 17, 17, and 17 of the first planetary two-stage gears 18, 18, and 18 are not integral multiples, when the large gear 16 of the first planetary two-stage gear 18 has 35 teeth and the small gear 17 has 32 teeth, and the large gear 42 of the second planetary two-stage gear 44 has 35 teeth and the small gear 43 has 34 teeth, the overall gear ratio (reduction ratio) is 10.4.

When the large gear 16 of the first planetary two-stage gear 18 has 35 teeth and the small gear 17 has 32 teeth, and the large gear 42 of the second planetary two-stage gear 44 has 35 teeth and the small gear 43 is changed to have 33 teeth, the overall gear ratio (reduction ratio) is 10.7.

In this way, as a result of the numbers of teeth of the respective large gears and small gears of the first planetary two-stage gears 18 and the second planetary two-stage gears 44 being set so as not to be integral multiples, and the respective gear ratios of the first planetary two-stage gears 18 and the second planetary two-stage gears 44 being selected as appropriate, the overall gear ratio (reduction ratio) can be finely adjusted even by 0.1. Therefore, even when limitations are applied to the size of the overall reduction mechanism, freedom in design becomes possible. Because the overall gear ratio (reduction ratio) can be finely adjusted, even in situations in which, ordinarily, the motor itself is required to be changed to obtain optimal torque, such situations can be supported without the motor being changed. Therefore, improvement in the degree of freedom in design and significant cost reduction can be achieved.

When the numbers of teeth are set so as not to be integral multiples, assembly can be accurately and easily performed by positioning markers for assembly being provided.

In addition, in a manner similar to the first planetary two-stage gears 18, 18, and 18, in the second planetary two-stage gears 44, 44, and 44 as well, the large gears 42, 42, and 42 and the small gears 43, 43, 43 may be composed of gears of which the respective numbers of teeth are integral multiples, or gears of which the respective numbers of teeth are not integral multiples.

The rotor 3 is configured by an outer cylinder 31 in which the shaft 11 is fixed at the center thereof and that covers a main magnet 30 disposed in the outer periphery. Reference number 32 represents a core.

Through use of the planetary gears having a two-stage structure actualized by the first planetary two-stage gears 18, 18, and 18 and the second planetary two-stage gears 44, 44, and 44, when the reduction ratio is the same, compared to a typical planetary gear having a one-stage structure, the diameter can be reduced to one-third or less. In addition, the number of selections of gear ratio can be significantly increased.

That is, the reduction mechanism 41 can be achieved in which an opportunity for selecting a desired gear ratio in relation to the outer dimensions of the gear can be obtained.

The rotor 3 and the shaft 11 rotate when the gear motor 1, configured as described above, is driven.

As a result of the rotation of the shaft 11, the sun gear 12 that is composed of a helical gear and is fixed to the shaft 11 rotates. As a result of the rotation of the sun gear 12, the large gears 16, 16, and 16 that are composed of helical gears and the small gears 17, 17, and 17 of the plurality of first planetary two-stage gears 18, 18, and 18 rotate at a reduced speed. In addition, the large gears 42, 42, and 42 that mesh with the small gears 17, 17, and 17, and the small gears 43, 43, and 43 of the plurality of second planetary two-stage gears 44, 44, and 44 rotate at a reduced speed. The small gears 43, 43, and 43 of the plurality of second planetary two-stage gears 44, 44, and 44 and the planetary gears 23, 23, and 23 that mesh with the internal gear 19 rotate.

As a result of the planetary gears 23, 23, and 23 meshing with the internal gear 19 and rotating, the sensor base 13 and the carrier mount 14 serving as the planetary carrier rotate. The shaft 24 that is fixed by a plurality of screws to the carrier mount 14 rotates.

Therefore, the rotation of the shaft 11 of the outer-rotor motor 2 can be reduced in speed by the meshing relationship between the sun gear 12 and the large gears 16, 16, and 16 of the first planetary two-stage gears 18, 18, and 18, the meshing relationship between the small gears 17, 17, and 17 of the first planetary two-stage gears 18, 18, and 18 and the large gears 42, 42, and 42 of the second planetary two-stage gears 44, 44, and 44, the meshing relationship between the small gears 43, 43, and 43 of the second planetary two-stage gears 44, 44, and 44 and the planetary gears 23, 23, and 23, and the meshing relationship between the planetary gears 23, 23, and 23 and internal gear 19. As a result, the range of speed reduction can be widely set. In addition, through use of the first planetary two-stage gears 18, 18, and 18 and the second planetary two-stage gears 44, 44, and 44, thinness, and size and weight reduction can be achieved, in a state in which gear strength is achieved.

In addition, as a result of the absolute sensor 25 that is disposed within the encoder housing chamber 5 that enters the free space 4 present in the center portion of the rotor 3 of the outer-rotor motor 2 in the planetary gear housing case 10, and the ring-shaped magnet 40 that is attached to the sensor base 13 in a section corresponding to the absolute sensor 25 in the encoder housing chamber 5 with the magnet attachment ring 39 therebetween, the rotation angle of the output shaft after speed reduction can be detected.

As the absolute sensor 25, in addition to the magnetic type described herein, other types of sensors, such as optical, capacitance, or contact, can also be used.

In this instance, the rotation position information recording member that provides the absolute sensor 25 with position information is changed as appropriate to a slit disk or the like, depending on the type of sensor.

In addition, when load is placed on a gear, such as when high torque output is required, a lubricant such as oil is generally used. Therefore, the magnetic absolute sensor 25 that is capable of accurate detection even when the oil splatters or the like is preferably used.

In addition, according to the first embodiment, the sun gear 12 and the large gears 16, 16, and 16 of the first planetary two-stage gears 18, 18, and 18 are composed of helical gears. However, spur gears or double helical gears may also be used. The other gears may also similarly be any of spur gears, helical gears, and double helical gears.

Furthermore, it is known that the module (tooth size) may be set to a low value regarding a gear with a small load. In the present invention, the respective modules of the large gears 16, 16, and 16 and the small gears 17, 17, and 17 of the first planetary two-stage gears 18, 18, and 18 are set to differing values. In addition, the module value of the large gears 16, 16, and 16 and the module value of the sun gear 12 with which the large gears 16, 16, and 16 mesh are matched. The module value of the small gears 17, 17, and 17 and the module value of the large gears 42, 42, and 42 of the second planetary two-stage gear 44 wish which the small gears 17, 17, and 17 mesh are matched. As a result, the reduction mechanism can be further reduced in size without any deterioration whatsoever in rotation performance.

The foregoing similarly applies to the second planetary two-stage gears 44, 44, and 44. The respective modules of the large gears 42, 42, and 42 and the small gears 43, 43, and 43 may be set to differing values.

In the gear motor 1, configured as described above, the carrier mount 14 serves as the output shaft as a result of the internal gear 19 being fixed. However, the gear motor 1 can also be configured such that the internal gear 19 serves as the output shaft as a result of the carrier mount 14 and the sensor base 13 serving as the planetary carrier being fixed.

When the internal gear 19 is set as the output shaft in this way, the absolute sensor 25 is required to be disposed within the encoder housing chamber 5 so as to rotate together with the internal gear.

(Other Embodiments for Carrying Out the Invention)

Next, other embodiments for carrying out the present invention will be described with reference to FIG. 14. In the description of the other embodiments for carrying out the present invention, constituent sections that are the same as those according to the first embodiment for carrying out the present invention are given the same reference numbers. Redundant descriptions are omitted.

Figure 13:
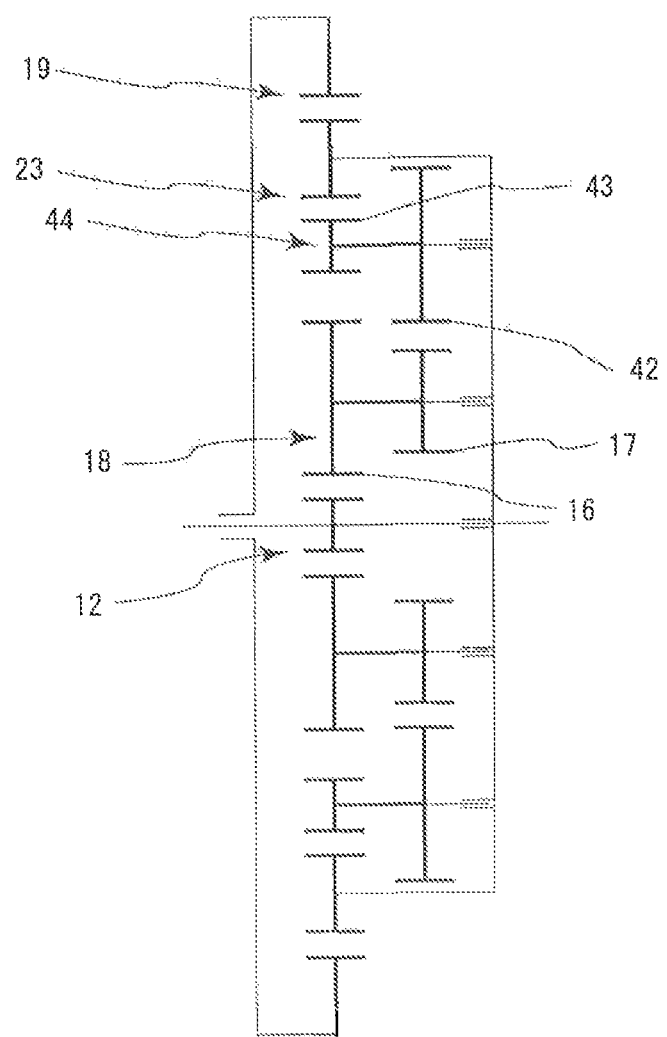
FIG. 13 is a schematic diagram of a combination of gears according to the first embodiment for carrying out the present invention.

First, FIG. 13 schematically shows the combination of gears according to the first embodiment for carrying out the present invention, shown in FIG. 1 to FIG. 12.

Figure 14:
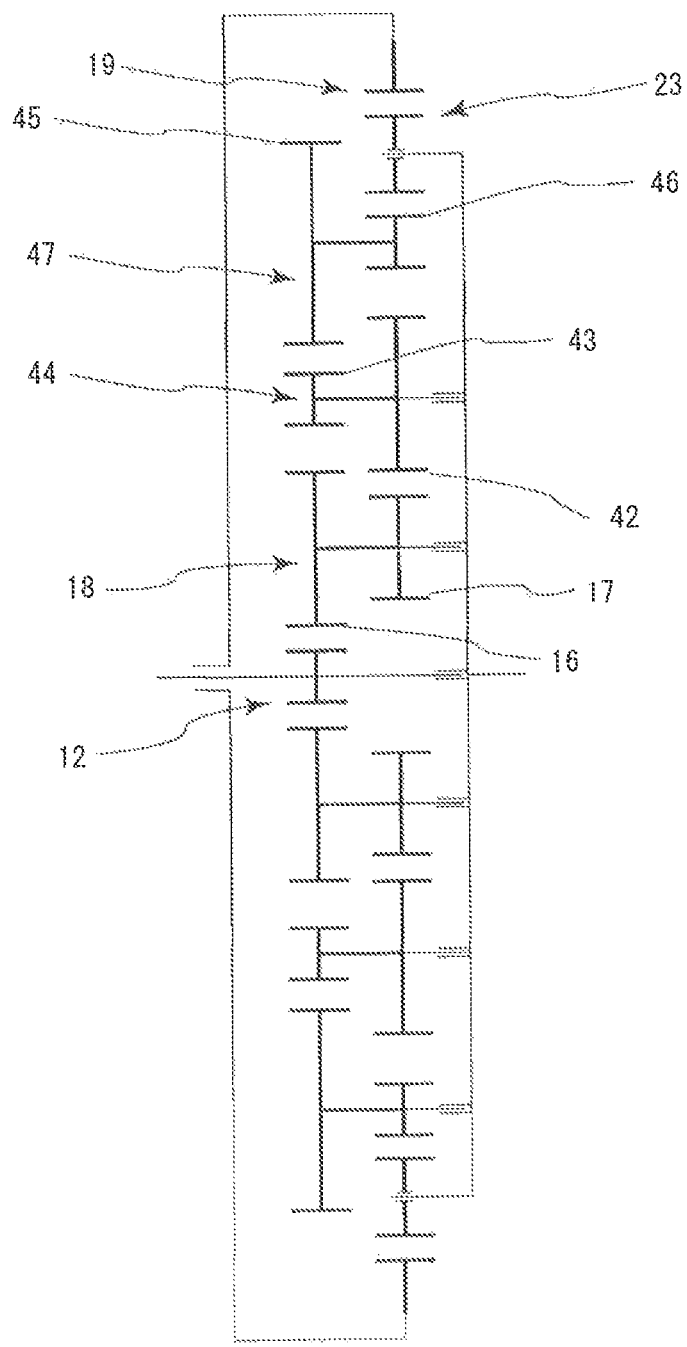
FIG. 14 is a schematic diagram of a combination of gears according to a second embodiment for carrying out the present invention.

FIG. 14 schematically shows the combination of gears according to a second embodiment, in a manner similar to FIG. 13.

The second embodiment for carrying out the present invention, shown in FIG. 14, mainly differs from the first embodiment for carrying out the present invention in that third planetary two-stage gears 47, 47, and 47 that include large gears 45, 45, and 45 that mesh with the small gears 43, 43, and 43 of the second planetary two-stage gears 44, 44, and 44 are arrayed in a horizontal direction such that the positional relationship between the small gears 43, 43, and 43 and the large gears 45, 45, and 45 is reversed upside down. As a result of the third planetary two-stage gears 47, 47, and 47 being arrayed in this way, the reduction ratio can be further increased without increase in the thickness of the reduction mechanism 41.

In addition, according to the first and second embodiments, the planetary gears 23, 23, and 23 may be omitted. In this case, according to the first embodiment, the small gears 43, 43, and 43 of the second planetary two-stage gears 44, 44, and 44 mesh with the internal gear 19. According to the second embodiment, the small gears 46, 46, and 46 of the second planetary two-stage gears 47, 47, and 47 mesh with the internal gear 19.

As a result of the planetary gears 23, 23, and 23 being omitted in this way, the diameter of the reduction mechanism 41 can be further reduced.

INDUSTRIAL APPLICABILITY

The present invention is used in an industry for manufacturing a reduction mechanism for gear motors having high torque output and used in muscle force assisting devices and the like, and gear motors using the reduction mechanism.

What is claimed is:

1. A gear motor comprising a reduction mechanism, said reduction mechanism comprising:
    a planetary gear mechanism which comprises a sun gear and an internal gear,
    a first planetary two-stage gear arrayed so as to be positioned between the sun gear and the internal gear, said first planetary two-stage gear comprising a small gear and a large gear,
    a second planetary two-stage gear comprising a small and a large gear,
    wherein the small gear or the large gear of the first planetary two-stage gear meshes together with the large gear or the small gear of the second planetary two-stage gear, and
    a ratio of the number of teeth of the large gear to the number of teeth of the small gear of the first planetary two-stage gear is an integral multiple, and
    both end portions of the first planetary two-stage gear are supported by ball bearings and
    a ratio of the number of teeth of the large gear to the number of teeth of the small gear of the second planetary two-stage gear is not an integral multiple.

2. The gear motor according to claim 1, wherein:
    a gear ratio of the large gear and the small gear of only one of the first and the second planetary two-stage gear is not an integral multiple.

3. The gear motor according to claim 2, wherein:
    the first planetary two-stage gear is arrayed in a horizontal direction such that a positional relationship of the small gear or the large gear of said first planetary two-stage gear that meshes together with the large gear or the small gear of the second planetary two-stage gear is reversed upside down.

4. The gear motor according to claim 3, wherein:
    modules of the large gear and the small gear of the first planetary two-stage gear are set to differing values.

5. The gear motor according to claim 2, wherein:
    modules of the large gear and the small gear of the first planetary two-stage gear are set to differing values.

6. The gear motor according to claim 1, wherein:
the first planetary two-stage gear is arrayed in a horizontal direction such that a positional relationship of the small gear or the large gear of said first planetary two-stage gear that meshes together with the large gear or the small gear of the second planetary two-stags gear is reversed upside down.

7. The gear motor according to claim 6, wherein:
modules of the large gear and the small gear of the first planetary two-stage gear are set to differing values.

8. A gear motor comprising a reduction mechanism, said reduction mechanism comprising:
- a planetary gear mechanism which comprises a sun gear and an internal gear,
- a first planetary two-stage gear arrayed so as to be positioned between the sun gear and the internal gear, said first planetary two-stage gear comprising a small gear and a large gear,
- a second planetary two-stage gear comprising a small and a large gear,
- wherein the small gear or the large gear of the first planetary two-stage gear meshes together with the large gear or the small gear of the second planetary two-stage gear, and
- a ratio of the number of teeth of the large gear to the number of teeth of the small gear of at least one of the first and the second planetary two-stage gear is an integral multiple, and
- both end portions of the first planetary two-stage gear are supported by ball bearings, and
- modules of the large gear and the small gear of the first planetary two-stage gear are set to differing values.

* * * * *